United States Patent
Chen et al.

(10) Patent No.: US 10,329,461 B2
(45) Date of Patent: Jun. 25, 2019

(54) ADHESIVE COMPOSITIONS COMPRISING LOW MOLECULAR WEIGHT FUNCTIONALIZED OLEFIN-BASED POLYMERS

(71) Applicant: Dow Global Technologies LLC, Midland, MI (US)

(72) Inventors: Liwen Chen, Philadelphia, PA (US); Selim Yalvac, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/310,309

(22) PCT Filed: Aug. 19, 2015

(86) PCT No.: PCT/US2015/045927
§ 371 (c)(1),
(2) Date: Nov. 10, 2016

(87) PCT Pub. No.: WO2016/028909
PCT Pub. Date: Feb. 25, 2016

(65) Prior Publication Data
US 2017/0292045 A1 Oct. 12, 2017

(51) Int. Cl.
| | | |
|---|---|---|
| C09J 11/08 | (2006.01) | |
| C09J 123/14 | (2006.01) | |
| C08L 23/14 | (2006.01) | |
| C09J 123/08 | (2006.01) | |
| C08L 51/06 | (2006.01) | |

(52) U.S. Cl.
CPC .............. C09J 11/08 (2013.01); C08L 23/14 (2013.01); C08L 23/147 (2013.01); C08L 51/06 (2013.01); C09J 123/0815 (2013.01); C09J 123/14 (2013.01); *Y02P 20/582* (2015.11)

(58) Field of Classification Search
None
See application file for complete search history.

(56) References Cited

U.S. PATENT DOCUMENTS

| | | | |
|---|---|---|---|
| 6,794,443 B2 | 9/2004 | Chu et al. | |
| 6,797,774 B2 | 9/2004 | Kijima | |
| 6,884,850 B2 | 4/2005 | Schauder et al. | |
| 7,262,251 B2 | 8/2007 | Kanderski et al. | |
| 7,378,481 B1 | 5/2008 | Gong et al. | |
| 7,439,307 B2 | 10/2008 | Schauder et al. | |
| 8,575,275 B2 | 11/2013 | Henschke et al. | |
| 2005/0003197 A1 | 1/2005 | Good et al. | |
| 2007/0117894 A1 | 5/2007 | Bach et al. | |
| 2007/0117906 A1 | 5/2007 | Bach et al. | |
| 2007/0117907 A1 | 5/2007 | Bach et al. | |
| 2009/0203847 A1 | 8/2009 | Ellis et al. | |
| 2010/0160497 A1* | 6/2010 | Karjala ..................... | C08F 8/00 524/13 |
| 2011/0015338 A1 | 1/2011 | Fujimura et al. | |
| 2011/0172348 A1 | 7/2011 | Hoya et al. | |
| 2012/0328805 A1 | 12/2012 | Davis | |
| 2012/0329929 A1 | 12/2012 | Miller et al. | |
| 2013/0295380 A1 | 11/2013 | Merrill et al. | |
| 2015/0080511 A1 | 3/2015 | Knutson et al. | |
| 2015/0166850 A1* | 6/2015 | Tse ......................... | C09J 123/06 524/528 |
| 2016/0046736 A1* | 2/2016 | Brindle, Jr. ............. | C08L 91/06 428/36.92 |
| 2016/0130477 A1 | 5/2016 | Chen et al. | |

FOREIGN PATENT DOCUMENTS

| | | | |
|---|---|---|---|
| JP | 2009057397 A | 3/2009 | |
| WO | 1997033921 A1 | 9/1997 | |
| WO | 2004039907 A1 | 5/2004 | |
| WO | 2006/109518 A1 | 10/2006 | |
| WO | 2007002177 A1 | 1/2007 | |
| WO | 2007146875 A2 | 12/2007 | |
| WO | 2011/014714 A2 | 2/2011 | |
| WO | 2013184187 A1 | 12/2013 | |
| WO | 2013185340 A1 | 12/2013 | |
| WO | WO 2014046834 A1 * | 3/2014 | ............ C09J 123/06 |
| WO | 2014070237 A1 | 5/2014 | |
| WO | 2016/209754 A1 | 12/2016 | |

OTHER PUBLICATIONS

Brochure "Additives for Adhesives Product Guide" from Honeywell, Nov. 2017.*
International Preliminary Report on Patentability for PCT/CN2014/084914, dated Feb. 21, 2017, pp. 1-6.
International Preliminary Report on Patentability for PCT/US2015/045927, dated Feb. 21, 2017, pp. 1-7.
International Search Report and Written Opinion for PCT/US2015/045927, dated Oct. 30, 2015, pp. 1-10.
International Search Report and Written Opinion for PCT/CN2014/084914, dated May 29, 2015, pp. 1-10.

* cited by examiner

*Primary Examiner* — Anish P Desai
(74) *Attorney, Agent, or Firm* — Husch Blackwell LLP

(57) ABSTRACT

The invention provides a composition comprising the following components: A) an olefin-based polymer; B) an anhydride and/or carboxylic acid functionalized olefin-based interpolymer comprising the following properties: i) a melt viscosity, at 190° C., less than, or equal to, 10,000 cP, and ii) a density from 0.900 to 0.950 g/cc.

13 Claims, No Drawings

ADHESIVE COMPOSITIONS COMPRISING LOW MOLECULAR WEIGHT FUNCTIONALIZED OLEFIN-BASED POLYMERS

REFERENCE TO RELATED APPLICATIONS

The present application claims priority to International Application No. PCT/CN14/084914, filed Aug. 21, 2014, incorporated herein by reference.

BACKGROUND

In packaging applications, the packaged good is often subject to elevated temperatures (e.g., temperatures greater than 50° C.) during the manufacture, transport and/or storage of the packaged good. High temperatures often cause rupture of adhesive welds and a loss of package integrity. Thus, there is a need for adhesive formulations that maintain good adhesion at high temperatures.

Adhesive formulations are disclosed in the following references: U.S. Pat. Nos. 6,797,774, 7,378,481, 7,262,251, 6,794,443, 6,884,850, 7,439,307; U.S. Publication Nos. 20100160497, 20090203847, 20070117906, 20070117907, 20070117894, 20050003197, 20110015338; International Publication Nos. WO1997033921, WO2010032600, WO 2006/109518, WO2007146875, WO 2011/014714; JP2009057397A (Abstract); CN101426877A (Abstract). However, as discussed, there remains a need for adhesive formulations that maintain good adhesion at high temperatures. There is a further need for such adhesives that will have good adhesion to "hard to bond" substrates.

SUMMARY OF THE INVENTION

The invention provides a composition comprising the following components:
A) an olefin-based polymer;
B) an anhydride and/or carboxylic acid functionalized olefin-based interpolymer comprising the following properties:
   i) a melt viscosity, at 190° C., less than, or equal to, 10,000 cP, and
   ii) a density from 0.900 to 0.950 g/cc.

DETAILED DESCRIPTION

As discussed above, the invention provides a composition comprising the following components:
A) an olefin-based polymer;
B) an anhydride and/or carboxylic acid functionalized olefin-based interpolymer comprising the following properties:
   i) a melt viscosity, at 190° C., less than, or equal to, 10,000 cP, and
   ii) a density from 0.900 to 0.950 g/cc, or from 0.910 to 0.945 g/cc, or from 0.920 to 0.940 g/cc.

The inventive composition may comprise a combination of two or more embodiments as described herein.

Component A may comprise a combination of two or more embodiments as described herein.

Component B may comprise a combination of two or more embodiments as described herein.

In one embodiment, the anhydride and/or carboxylic acid functionalized interpolymer is an anhydride and/or carboxylic acid functionalized copolymer In one embodiment, the anhydride and/or carboxylic acid functionalized olefin-based interpolymer of Component B is an anhydride grafted interpolymer, and further an anhydride grafted copolymer. One skilled in the art would understand that some anhydride groups may be converted to acid groups in the presence of moisture. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, the anhydride and/or carboxylic acid functionalized olefin-based interpolymer of Component B is a maleic anhydride (MAH) grafted interpolymer, and further a maleic anhydride (MAH) grafted copolymer. One skilled in the art would understand that some maleic anhydride groups may be converted to acid groups in the presence of moisture. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, the anhydride and/or carboxylic acid functionalized olefin-based interpolymer of Component B has a melt viscosity less than, or equal to, 8,000 cP, further less than, or equal to, 5,000 cP, further less than, or equal to, 4,000 cP, and further less than, or equal to, 3,000 cP, at 190° C. In a further embodiment, the anhydride and/or carboxylic acid functionalized olefin-based interpolymer is an anhydride and/or carboxylic acid functionalized copolymer. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, anhydride and/or carboxylic acid functionalized olefin-based interpolymer of Component B has a melt viscosity greater than, or equal to, 100 cP, further greater than, or equal to, 120 cP, further greater than, or equal to, 150 cP, at 190° C. In a further embodiment, the anhydride and/or carboxylic acid functionalized olefin-based interpolymer is an anhydride and/or carboxylic acid functionalized copolymer. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, the anhydride and/or carboxylic acid functionalized olefin-based interpolymer of Component B has a melt viscosity from 100 cP to 10,000 cP, further from 120 cP to 8,000 cP, further from 150 cP to 5,000 cP, and further from 150 cP to 3,000 cP, at 190° C. In a further embodiment, the anhydride and/or carboxylic acid functionalized olefin-based interpolymer is an anhydride and/or carboxylic acid functionalized copolymer. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, component B is present in an amount from 1 to 40 weight percent, further from 1 to 30 weight percent, further from 1 to 20 weight percent, based on the weight of the composition. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, the anhydride and/or carboxylic acid functionalized olefin-based interpolymer of Component B has a density greater than, or equal to, 0.905 g/cc, further greater than, or equal to, 0.910 g/cc, further greater than, or equal to, 0.915 g/cc, and further greater than, or equal to, 0.920 g/cc (1 cc=1 cm$^3$). In a further embodiment, the anhydride and/or carboxylic acid functionalized interpolymer is an anhydride and/or carboxylic acid functionalized copolymer. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, the anhydride and/or carboxylic acid functionalized olefin-based interpolymer of Component B has a density less than, or equal to, 0.945 g/cc, further less than, or equal to, 0.940 g/cc, and further less than, or equal to, 0.935 g/cc. In a further embodiment, the anhydride and/or carboxylic acid functionalized interpolymer is an anhydride and/or carboxylic acid functionalized copolymer. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, the anhydride and/or carboxylic acid functionalized olefin-based interpolymer of Component B has a density from 0.905 g/cc to 0.945 g/cc, further from 0.910 g/cm$^3$ to 0.940 g/cc, and further from 0.915 g/cm$^3$ to 0.935 g/cc. In a further embodiment, the anhydride and/or carboxylic acid functionalized interpolymer is an anhydride and/or carboxylic acid functionalized copolymer. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, the anhydride and/or carboxylic acid functionalized olefin-based interpolymer of component B comprises greater than, or equal to, 0.5 weight percent, further greater than, or equal to, 0.8 weight percent, further greater than, or equal to, 1.0 weight percent, further greater than, or equal to, 1.2 weight percent, and further greater than, or equal to, 1.5 weight percent of the anhydride and/or carboxylic acid functionality, based on the weight of the polymer. In a further embodiment, the anhydride and/or carboxylic acid functionalized interpolymer is an anhydride and/or carboxylic acid functionalized copolymer. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, the anhydride and/or carboxylic acid functionalized olefin-based interpolymer of Component B comprises from 0.5 to 5.0 weight percent, further from 0.8 to 4.8 weight percent, further from 1.0 to 4.5 weight percent of the anhydride and/or carboxylic acid functionality, based on the weight of the polymer. In a further embodiment, the anhydride and/or carboxylic acid functionalized interpolymer is an anhydride and/or carboxylic acid functionalized copolymer. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, the anhydride and/or carboxylic acid functionalized olefin-based interpolymer of Component B comprises greater than, or equal to, 60 wt %, further greater than, or equal to, 70 wt %, further greater than, or equal to, 80 wt %, further greater than, or equal to, 85 wt %, polymerized olefin (for example, propylene or ethylene), based on the weight of the functionalized interpolymer. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, the anhydride and/or carboxylic acid functionalized olefin-based interpolymer of Component B comprises less than 1 wt %, further less than 0.5 wt % of an acrylate. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, the anhydride and/or carboxylic acid functionalized olefin-based interpolymer of Component B does not comprise an acrylate. In a further embodiment, the functionalized olefin-based interpolymer is a functionalized propylene-based interpolymer, and further a functionalized propylene-based copolymer. In another embodiment, the functionalized olefin-based interpolymer is a functionalized ethylene-based interpolymer, and further a functionalized ethylene-based copolymer.

In one embodiment, the functionalized olefin-based interpolymer of component B is an anhydride and/or carboxylic acid functionalized propylene-based interpolymer, and further a functionalized propylene-based copolymer.

In one embodiment, the anhydride and/or carboxylic acid functionalized propylene-based interpolymer comprises greater than, or equal to, 60 wt %, further greater than, or equal to, 70 wt %, further greater than, or equal to, 80 wt %, further greater than, or equal to, 85 wt %, polymerized propylene, based on the weight of the functionalized interpolymer.

In one embodiment, the functionalized propylene-based interpolymer of component B is an anhydride and/or carboxylic acid functionalized propylene/alpha-olefin interpolymer, and further an anhydride and/or carboxylic acid functionalized propylene/alpha-olefin copolymer, or an anhydride and/or carboxylic acid functionalized propylene/ ethylene interpolymer, and further an anhydride and/or carboxylic acid functionalized propylene/ethylene copolymer.

In one embodiment, the anhydride and/or carboxylic acid functionalized propylene-based interpolymer is an anhydride and/or carboxylic acid functionalized propylene/alpha-olefin interpolymer, and further an anhydride and/or carboxylic acid functionalized propylene/alpha-olefin copolymer. Preferred α-olefins include, but are not limited to, C4-C20 α-olefins, and preferably C4-C10 α-olefins. More preferred α-olefins include 1-butene, 1-pentene, 1-hexene, 1-heptene and 1-octene, further include 1-butene, 1-hexene and 1-octene, and further 1-hexene and 1-octene.

In one embodiment, the anhydride and/or carboxylic acid functionalized propylene-based interpolymer is an anhydride and/or carboxylic acid functionalized propylene/ethylene interpolymer, and further an anhydride and/or carboxylic acid functionalized propylene/ethylene copolymer.

In one embodiment, the functionalized olefin-based interpolymer of component B is an anhydride and/or carboxylic acid functionalized ethylene-based interpolymer, and further an anhydride and/or carboxylic acid functionalized ethylene-based copolymer.

In one embodiment, the anhydride and/or carboxylic acid functionalized ethylene-based interpolymer comprises greater than, or equal to, 60 wt %, further greater than, or equal to, 70 wt %, further greater than, or equal to, 80 wt %, further greater than, or equal to, 85 wt %, polymerized ethylene, based on the weight of the functionalized interpolymer.

In one embodiment, the anhydride and/or carboxylic acid functionalized olefin-based interpolymer of component B is an anhydride and/or carboxylic acid functionalized ethylene/alpha-olefin interpolymer, and further an anhydride and/or carboxylic acid functionalized ethylene/alpha-olefin copolymer. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and further propylene, 1-butene, 1-hexene and 1-octene.

Suitable functionalized olefin-based interpolymers of Component B include MAH-grafted olefin-based copolymers available from Honeywell.

An anhydride and/or carboxylic acid functionalized olefin-based interpolymer, and further an anhydride and/or carboxylic acid functionalized olefin-based copolymer, of Component B, may comprise a combination of two or more embodiments as described herein.

An anhydride and/or carboxylic acid functionalized propylene-based interpolymer, and further an anhydride and/or carboxylic acid functionalized propylene-based copolymer, of Component B, may comprise a combination of two or more embodiments as described herein.

An anhydride and/or carboxylic acid functionalized ethylene-based interpolymer, and further an anhydride and/or carboxylic acid functionalized ethylene-based copolymer, of Component B, may comprise a combination of two or more embodiments as described herein.

In one embodiment, the composition comprises from 30 to 90 weight percent, further from 35 to 80 weight percent, and further from 40 to 70 weight percent, of Component A, based on the weight of the composition.

In one embodiment, the weight ratio of Component A to Component B (A/B) is greater than, or equal to, 1.5, further greater than, or equal to, 1.8, and further greater than, or equal to, 2.2.

In one embodiment, the weight ratio of Component A to Component B (A/B) is less than, or equal to, 30, further less than, or equal to, 20, and further less than, or equal to, 10.

In one embodiment, the olefin-based polymer of Component A has a density greater than, or equal to, 0.855 g/cc, further greater than, or equal to, 0.860 g/cc, add further greater than, or equal to, 0.865 g/cc (1 cc=1 cm$^3$). In a further embodiment, the olefin-based polymer is a propylene-based polymer, further a propylene-based interpolymer, and further a propylene-based copolymer. In another embodiment, the olefin-based polymer is an ethylene-based polymer, further an ethylene-based interpolymer, and further an ethylene-based copolymer.

In one embodiment, the olefin-based polymer of Component A has a density less than, or equal to, 0.895 g/cc, and further less than, or equal to, 0.890 g/cc, and further less than, or equal to, 0.885 g/cc, and further less than, or equal to, 0.880 g/cc, and further less than, or equal to, 0.875 g/cc. In a further embodiment, the olefin-based polymer is a propylene-based polymer, further a propylene-based interpolymer, and further a propylene-based copolymer. In another embodiment, the olefin-based polymer is an ethylene-based polymer, further an ethylene-based interpolymer, and further an ethylene-based copolymer.

In one embodiment, the olefin-based polymer of Component A has a density from 0.855 g/cc to 0.895 g/cc, further from 0.860 g/cc to 0.895 g/cc, and further from 0.865 g/cc to 0.890 g/cc, and further from 0.865 g/cc to 0.885 g/cc, and further from 0.865 g/cc to 0.880 g/cc, and further from 0.865 g/cc to 0.875 g/cc. In a further embodiment, the olefin-based polymer is a propylene-based polymer, further a propylene-based interpolymer, and further a propylene-based copolymer. In another embodiment, the olefin-based polymer is an ethylene-based polymer, further an ethylene-based interpolymer, and further an ethylene-based copolymer.

In one embodiment, the olefin-based polymer of Component A has a melt viscosity, at 177° C., less than, or equal to, 50,000 cP, further less than, or equal to, 40,000 cP, further less than, or equal to, 30,000 cP. In a further embodiment, the olefin-based polymer is a propylene-based polymer, further a propylene-based interpolymer, and further a propylene-based copolymer. In another embodiment, the olefin-based polymer is an ethylene-based polymer, further an ethylene-based interpolymer, and further an ethylene-based copolymer.

In one embodiment, the olefin-based polymer of Component A has a melt viscosity less than, or equal to, 25,000 cP, further less than, or equal to, 20,000 cP, further less than, or equal to, 15,000 cP, and further less than, or equal to, 10,000 cP, at 350° F. (177° C.). In a further embodiment, the olefin-based polymer is a propylene-based polymer, further a propylene-based interpolymer, and further a propylene-based copolymer. In another embodiment, the olefin-based polymer is an ethylene-based polymer, further an ethylene-based interpolymer, and further an ethylene-based copolymer.

In one embodiment, the olefin-based polymer of Component A has a melt viscosity greater than, or equal to, 2,000 cP, further greater than, or equal to, 3,000 cP, further greater than, or equal to, 4,000 cP, and further greater than, or equal to, 5,000 cP, at 350° F. (177° C.). In a further embodiment, the olefin-based polymer is a propylene-based polymer, further a propylene-based interpolymer, and further a propylene-based copolymer. In another embodiment, the olefin-based polymer is an ethylene-based polymer, further an ethylene-based interpolymer, and further an ethylene-based copolymer.

In one embodiment, olefin-based polymer of Component A has a melt viscosity from 2,000 cP to 50,000 cP, further from 3,000 cP to 40,000 cP, further from 4,000 cP to 30,000 cP, at 350° F. (177° C.), further from 5,000 cP to 20,000 cP, at 350° F. (177° C.), further from 5,000 cP to 15,000 cP, at 350° F. (177° C.), and further from 5,000 cP to 10,000 cP, at 350° F. (177° C.). In a further embodiment, the olefin-based polymer is a propylene-based polymer, further a propylene-based interpolymer, and further a propylene-based copolymer. In another embodiment, the olefin-based polymer is an ethylene-based polymer, further an ethylene-based interpolymer, and further an ethylene-based copolymer.

In one embodiment, the olefin-based polymer of Component A has a molecular weight distribution (Mw/Mn) less than, or equal to, 5.0, further less than, or equal to, 4.5, further less than, or equal to, 3.0, and further less than, or equal to, 2.5. In a further embodiment, the olefin-based polymer is a propylene-based polymer, further a propylene-based interpolymer, and further a propylene-based copolymer. In another embodiment, the olefin-based polymer is an ethylene-based polymer, further an ethylene-based interpolymer, and further an ethylene-based copolymer.

In one embodiment, the olefin-based polymer of Component A has a molecular weight distribution (Mw/Mn) greater than, or equal to, 1.5, further greater than, or equal to, 2.0, further greater than, or equal to, 2.5, and further greater than, or equal to, 2.7. In a further embodiment, the olefin-based polymer is a propylene-based polymer, further a propylene-based interpolymer, and further a propylene-based copolymer. In another embodiment, the olefin-based polymer is an ethylene-based polymer, further an ethylene-based interpolymer, and further an ethylene-based copolymer.

In one embodiment, the olefin-based polymer of Component A has a melt index (I2 or MI), or calculated melt index (I2 or MI), less than, or equal to, 2000 g/10 min, further less than, or equal to, 1500 g/10 min, and further less than, or equal to, 1200 g/10 min. In a further embodiment, the olefin-based polymer is an ethylene-based polymer, further an ethylene-based interpolymer, and further an ethylene-based copolymer.

In one embodiment, the olefin-based polymer of Component A has a melt flow rate (MFR) less than, or equal to, 2000 g/10 min, further less than, or equal to, 1500 g/10 min, and further less than, or equal to, 1200 g/10 min. In a further embodiment, the olefin-based polymer is a propylene-based polymer, further a propylene-based interpolymer, and further a propylene-based copolymer.

In one embodiment, the olefin-based polymer of Component A comprises greater than, or equal to, 60 wt %, further greater than, or equal to, 70 wt %, further greater than, or equal to, 80 wt %, further greater than, or equal to, 85 wt %, polymerized olefin (for example, propylene or ethylene), based on the weight of the polymer. In a further embodiment, the olefin-based polymer is a propylene-based polymer, further a propylene-based interpolymer, and further a propylene-based copolymer. In another embodiment, the olefin-based polymer is an ethylene-based polymer, further an ethylene-based interpolymer, and further an ethylene-based copolymer.

In one embodiment, the olefin-based polymer of Component A is a propylene-based polymer, and further a propylene/alpha-olefin interpolymer, and further a propylene/alpha-olefin copolymer, or a propylene/ethylene interpolymer, and further a propylene/ethylene copolymer.

In one embodiment, the propylene-based polymer comprises greater than, or equal to, 60 wt %, further greater than, or equal to, 70 wt %, further greater than, or equal to, 80 wt %, further greater than, or equal to, 85 wt %, polymerized propylene, based on the weight of the polymer. In a further embodiment, the propylene-based polymer is a propylene-based interpolymer, and further a propylene-based copolymer.

In one embodiment, the polymer of Component A is a propylene/alpha-olefin interpolymer, and further a propylene/alpha-olefin copolymer. Preferred α-olefins include, but are not limited to, C4-C20 α-olefins, and preferably C4-C10 α-olefins. More preferred α-olefins include 1-butene, 1-pentene, 1-hexene, 1-heptene and 1-octene, further include 1-butene, 1-hexene and 1-octene, and further 1-hexene and 1-octene.

In one embodiment, the olefin-based polymer of Component A is a propylene/ethylene interpolymer, and further a propylene/ethylene copolymer.

In one embodiment, the olefin-based polymer of Component A is an ethylene-based polymer, and further an ethylene/alpha-olefin interpolymer, and further an ethylene/alpha-olefin copolymer.

In one embodiment, the ethylene-based polymer comprises greater than, or equal to, 60 wt %, further greater than, or equal to, 70 wt %, further greater than, or equal to, 80 wt %, further greater than, or equal to, 85 wt %, polymerized ethylene, based on the weight of the polymer. In a further embodiment, the ethylene-based polymer is an ethylene-based interpolymer, and further an ethylene-based copolymer.

In one embodiment, the polymer of Component A is an ethylene/alpha-olefin interpolymer, and further an ethylene/alpha-olefin copolymer. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, further include propylene, 1-butene, 1-hexene and 1-octene, and further 1-butene, 1-hexene and 1-octene.

In one embodiment, the ethylene/alpha-olefin interpolymer of Component A has a percent crystallinity of less than, or equal to, 40 percent, further less than, or equal to, 35 percent, further less than, or equal to, 30 percent, further less than, or equal to, 25 percent, and further less than, or equal to, 20 percent, as determined by DSC. In a further embodiment, the ethylene/alpha-olefin interpolymer is an ethylene/alpha-olefin copolymer.

In one embodiment, the ethylene/alpha-olefin interpolymer of Component A has a percent crystallinity of greater than, or equal to, 2 percent, further greater than, or equal to, 5 percent, and further greater than, or equal to, 10 percent, as determined by DSC. In a further embodiment, the ethylene/alpha-olefin interpolymer is an ethylene/alpha-olefin copolymer.

In one embodiment, the ethylene/α-olefin interpolymer of Component A is a homogeneously branched linear interpolymer, and preferably a homogeneously branched linear copolymer, or a homogeneous branched substantially linear interpolymer, and preferably a homogeneous branched substantially linear copolymer.

In one embodiment, the ethylene/α-olefin interpolymer of Component A is a homogeneously branched linear interpolymer, and preferably a homogeneous branched linear copolymer.

In one embodiment, the ethylene/α-olefin interpolymer of Component A is a homogeneous branched substantially linear interpolymer, and preferably a homogeneous branched substantially linear copolymer.

Some examples of ethylene/α-olefin interpolymers and copolymers include AFFINITY GA Polyolefin Plastomers, available from The Dow Chemical Company, and LICOCENE Performance Polymers from Clariant. Other examples of ethylene/α-olefin interpolymers and copolymers suitable for the invention include the ultra low molecular weight ethylene polymers described in U.S. Pat. Nos. 6,335,410, 6,054,544 and 6,723,810, each fully incorporated herein by reference.

The olefin-based polymer of Component A may comprise a combination of two or more embodiments as described herein.

The propylene-based polymer of Component A may comprise a combination of two or more embodiments as described herein.

The ethylene-based polymer of Component A may comprise a combination of two or more embodiments as described herein.

In one embodiment, the composition has a melt viscosity at 177° C. from 50 to 3000 cP, further from 100 to 2500 cP, further from 150 to 2000 cP, and further from 200 to 1600 cP.

In one embodiment, the olefin-based polymer of Component A has a density from 0.855 g/cc to 0.895 g/cc, further from 0.860 g/cc to 0.895 g/cc, further from 0.865 g/cc to 0.890 g/cc, further from 0.865 g/cc to 0.885 g/cc, further from 0.865 g/cc to 0.880 g/cc, and further from 0.865 g/cc to 0.875 g/cc. In a further embodiment, the density ratio of Component B to Component A is greater than, or equal to, 1.01, further greater than, or equal to, 1.03, further greater than, or equal to, 1.05. In a further embodiment, the anhydride and/or carboxylic acid functionalized olefin-based interpolymer (Component B) is an anhydride and/or carboxylic acid functionalized propylene-based interpolymer or copolymer, and further an anhydride and/or carboxylic acid functionalized propylene/alpha-olefin interpolymer or copolymer, or an anhydride and/or carboxylic acid functionalized propylene/ethylene interpolymer or copolymer. In a further embodiment, the olefin-based polymer (Component A) is a propylene/alpha-olefin interpolymer or copolymer, or a propylene/ethylene interpolymer or copolymer. Preferred α-olefins include, but are not limited to, C4-C20 α-olefins, and preferably C4-C10 α-olefins. More preferred α-olefins include 1-butene, 1-pentene, 1-hexene, 1-heptene and 1-octene, further include 1-butene, 1-hexene and 1-octene, and further 1-hexene and 1-octene.

In one embodiment, the olefin-based polymer of Component A has a density from 0.855 g/cc to 0.895 g/cc, further from 0.860 g/cc to 0.895 g/cc, further from 0.865 g/cc to 0.890 g/cc, further from 0.865 g/cc to 0.885 g/cc, further from 0.865 g/cc to 0.880 g/cc, and further from 0.865 g/cc to 0.875 g/cc. In a further embodiment, the density ratio of Component B to Component A is less than, or equal to, 1.20, further less than, or equal to, 1.15, further less than, or equal to, 1.10. In a further embodiment, the anhydride and/or carboxylic acid functionalized olefin-based interpolymer (Component B) is an anhydride and/or carboxylic acid functionalized propylene-based interpolymer or copolymer, and further an anhydride and/or carboxylic acid functionalized propylene/alpha-olefin interpolymer or copolymer, or an anhydride and/or carboxylic acid functionalized propylene/ethylene interpolymer or copolymer. In a further embodiment, the olefin-based polymer (Component A) is a propylene/alpha-olefin interpolymer or copolymer, or a propylene/ethylene interpolymer or copolymer. Preferred α-olefins include, but are not limited to, C4-C20 α-olefins, and preferably C4-C10 α-olefins. More preferred α-olefins include 1-butene, 1-pentene, 1-hexene, 1-heptene and 1-octene, further include 1-butene, 1-hexene and 1-octene, and further 1-hexene and 1-octene.

In one embodiment, the olefin-based polymer of Component A has a density from 0.855 g/cc to 0.895 g/cc, further from 0.860 g/cc to 0.895 g/cc, further from 0.865 g/cc to 0.890 g/cc, further from 0.865 g/cc to 0.885 g/cc, further from 0.865 g/cc to 0.880 g/cc, and further from 0.865 g/cc to 0.875 g/cc. In a further embodiment, the density ratio of Component B to Component A is from 1.01 to 1.15, further from 1.03 to 1.12, further from 1.05 to 1.10. In a further embodiment, the anhydride and/or carboxylic acid functionalized olefin-based interpolymer (Component B) is an anhydride and/or carboxylic acid functionalized propylene-based interpolymer or copolymer, and further an anhydride and/or carboxylic acid functionalized propylene/alpha-olefin interpolymer or copolymer, or an anhydride and/or carboxylic acid functionalized propylene/ethylene interpolymer or copolymer. In a further embodiment, the olefin-based polymer (Component A) is a propylene/alpha-olefin interpolymer or copolymer, or a propylene/ethylene interpolymer or copolymer. Preferred α-olefins include, but are not limited to, C4-C20 α-olefins, and preferably C4-C10 α-olefins. More preferred α-olefins include 1-butene, 1-pentene, 1-hexene, 1-heptene and 1-octene, further include 1-butene, 1-hexene and 1-octene, and further 1-hexene and 1-octene.

In one embodiment, olefin-based polymer of Component A has a melt viscosity from 2,000 cP to 50,000 cP, further from 3,000 cP to 40,000 cP, further from 4,000 cP to 30,000 cP, at 350° F. (177° C.), further from 5,000 cP to 20,000 cP, at 350° F. (177° C.), further from 5,000 cP to 15,000 cP, at 350° F. (177° C.), and further from 5,000 cP to 10,000 cP, at 350° F. (177° C.). In a further embodiment, the ratio of the "melt viscosity (at 177° C.) of Component A" to "the melt viscosity (at 190° C.) of Component B" is from 2.0 to 60.0, further from 5.0 to 60.0, further from 10.0 to 60.0, further from 20.0 to 60.0, further from 30.0 to 60.0. In a further embodiment, the anhydride and/or carboxylic acid functionalized olefin-based interpolymer (Component B) is an anhydride and/or carboxylic acid functionalized propylene-based interpolymer or copolymer, and further an anhydride and/or carboxylic acid functionalized propylene/alpha-olefin interpolymer or copolymer, or an anhydride and/or carboxylic acid functionalized propylene/ethylene interpolymer or copolymer. In a further embodiment, the olefin-based polymer (Component A) is a propylene/alpha-olefin interpolymer or copolymer, or a propylene/ethylene interpolymer or copolymer. Preferred α-olefins include, but are not limited to, C4-C20 α-olefins, and preferably C4-C10 α-olefins. More preferred α-olefins include 1-butene, 1-pentene, 1-hexene, 1-heptene and 1-octene, further include 1-butene, 1-hexene and 1-octene, and further 1-hexene and 1-octene.

In one embodiment, the olefin-based polymer of Component A has a density from 0.855 g/cc to 0.895 g/cc, further from 0.860 g/cc to 0.895 g/cc, further from 0.865 g/cc to 0.890 g/cc, further from 0.865 g/cc to 0.885 g/cc, further from 0.865 g/cc to 0.880 g/cc, and further from 0.865 g/cc to 0.875 g/cc; and Component A has a melt viscosity from 2,000 cP to 50,000 cP, further from 3,000 cP to 40,000 cP, further from 4,000 cP to 30,000 cP, at 350° F. (177° C.), further from 5,000 cP to 20,000 cP, at 350° F. (177° C.), further from 5,000 cP to 15,000 cP, at 350° F. (177° C.), and further from 5,000 cP to 10,000 cP, at 350° F. (177° C.). In a further embodiment, density ratio of Component B to Component A is from 1.01 to 1.15, further from 1.03 to 1.12, further from 1.05 to 1.10; and the ratio of "the melt viscosity (at 177° C.) of Component A" to "the melt viscosity (at 190°

C.) of Component B" is from 2.0 to 60.0, further from 5.0 to 60.0, further from 10.0 to 60.0, further from 20.0 to 60.0, further from 30.0 to 60.0. In a further embodiment, the anhydride and/or carboxylic acid functionalized olefin-based interpolymer (Component B) is an anhydride and/or carboxylic acid functionalized propylene-based interpolymer or copolymer, and further an anhydride and/or carboxylic acid functionalized propylene/alpha-olefin interpolymer or copolymer, or an anhydride and/or carboxylic acid functionalized propylene/ethylene interpolymer or copolymer. In a further embodiment, the olefin-based polymer (Component A) is a propylene/alpha-olefin interpolymer or copolymer, or a propylene/ethylene interpolymer or copolymer. Preferred α-olefins include, but are not limited to, C4-C20 α-olefins, and preferably C4-C10 α-olefins. More preferred α-olefins include 1-butene, 1-pentene, 1-hexene, 1-heptene and 1-octene, further include 1-butene, 1-hexene and 1-octene, and further 1-hexene and 1-octene.

In one embodiment, sum weight of Component B to Component A is greater than, or equal to, 40 wt %, or greater than, or equal to, 45 wt %, or greater than, or equal to, 50 wt %, or greater than, or equal to, 55 wt %, or greater than, or equal to, 60 wt %, based on the weight of the composition. In a further embodiment, the anhydride and/or carboxylic acid functionalized olefin-based interpolymer (Component B) is an anhydride and/or carboxylic acid functionalized propylene-based interpolymer or copolymer, and further an anhydride and/or carboxylic acid functionalized propylene/alpha-olefin interpolymer or copolymer, or an anhydride and/or carboxylic acid functionalized propylene/ethylene interpolymer or copolymer. In a further embodiment, the olefin-based polymer (Component A) is a propylene/alpha-olefin interpolymer or copolymer, or a propylene/ethylene interpolymer or copolymer. Preferred α-olefins include, but are not limited to, C4-C20 α-olefins, and preferably C4-C10 α-olefins. More preferred α-olefins include 1-butene, 1-pentene, 1-hexene, 1-heptene and 1-octene, further include 1-butene, 1-hexene and 1-octene, and further 1-hexene and 1-octene.

In one embodiment, olefin-based polymer of Component A has a melt viscosity from 2,000 cP to 50,000 cP, further from 3,000 cP to 40,000 cP, further from 4,000 cP to 30,000 cP, at 350° F. (177° C.), further from 5,000 cP to 20,000 cP, at 350° F. (177° C.), further from 5,000 cP to 15,000 cP, at 350° F. (177° C.), and further from 5,000 cP to 10,000 cP, at 350° F. (177° C.). In a further embodiment, Component A has the highest melt viscosity (at 177° C.) of all of the polymer components of the composition. In a further embodiment, the anhydride and/or carboxylic acid functionalized olefin-based interpolymer (Component B) is an anhydride and/or carboxylic acid functionalized propylene-based interpolymer or copolymer, and further an anhydride and/or carboxylic acid functionalized propylene/alpha-olefin interpolymer or copolymer, or an anhydride and/or carboxylic acid functionalized propylene/ethylene interpolymer or copolymer. In a further embodiment, the olefin-based polymer (Component A) is a propylene/alpha-olefin interpolymer or copolymer, or a propylene/ethylene interpolymer or copolymer. Preferred α-olefins include, but are not limited to, C4-C20 α-olefins, and preferably C4-C10 α-olefins. More preferred α-olefins include 1-butene, 1-pentene, 1-hexene, 1-heptene and 1-octene, further include 1-butene, 1-hexene and 1-octene, and further 1-hexene and 1-octene An inventive composition may comprise two or more embodiments described here.

Component A may comprise a combination of two or more embodiments described herein.

Component B may comprise a combination of two or more embodiments described herein.

In one embodiment, the composition further comprises a wax.

Waxes include, but are not limited to, paraffin waxes, microcrystalline waxes, high density, low molecular weight polyethylene waxes, polypropylene waxes, thermally degraded waxes, by-product polyethylene waxes, Fischer-Tropsch waxes, oxidized Fischer-Tropsch waxes, and functionalized waxes, such as hydroxy stearamide waxes and fatty amide waxes. It is common in the art to use the terminology "synthetic high melting point waxes" to include high density, low molecular weight polyethylene waxes, by-product polyethylene waxes and Fischer-Tropsch waxes. Other waxes also include those described in U.S. Pat. Nos. 6,335,410; 6,054,544 and 6,723,810; which are all incorporated herein by reference. Preferred waxes include, but are not limited to, SASOL waxes (e.g., SASOLWAX H1 from Sasol Wax Company), and Fischer-Tropsch waxes.

In one embodiment, the composition comprises from 1 to 30 weight percent, and further from 2 to 25 weight percent, and further from 5 to 20 weight percent of the wax, based on the weight of the composition.

In one embodiment, the composition further comprises a tackifier.

Suitable tackifying resins include, but are not limited to, aliphatic, cycloaliphatic and aromatic hydrocarbons, and modified hydrocarbons and hydrogenated versions; terpenes and modified terpenes and hydrogenated versions; and rosins and rosin derivatives and hydrogenated versions; and mixtures thereof. Suitable tackifiers include, but are not limited to, EASTOTAC H100 and EASTOTAC H115, each available from Eastman Chemical.

In one embodiment, the composition comprises from 10 to 50 weight percent, and further from 15 to 45 weight percent, further from 20 to 40 weight percent of the tackifier. In a further embodiment, the tackifier is a hydrocarbon, and further a hydrogenated hydrocarbon.

In one embodiment, the composition is subject to a mechanical homogenizer process to reduce the viscosity of the composition. The intense energy and mechanical forces, formed from such a process, cause turbulence and localized pressure differences, which create shear on particles and cause molecular chain scission.

An inventive composition may comprise a combination of two or more embodiments described herein.

The invention also provides an article comprising an inventive composition.

In a further embodiment, the article further comprises a substrate. In a further embodiment, the substrate is selected from the group consisting of the following: coated substrates, a recycled paper, and combinations thereof.

In one embodiment, the substrate is selected from the group consisting of the following: wax coated Kraft or carton, polyethylene coated Kraft or carton, BOPP film laminated Kraft or carton, polypropylene (PP) film laminated Kraft or carton, PET film laminated Kraft or carton, clay coated Kraft or carton, lacquer coated Kraft or carton, and combinations thereof.

In a further embodiment, the substrate is selected from the group consisting of the following:
  (1) Wax coated Kraft or carton,
  (2) Polyethylene coated Kraft or carton,
  (3) BOPP film laminated Kraft or carton,
  (4) Polypropylene (PP) film laminated Kraft or carton,
  (5) PET film laminated Kraft or carton,
  (6) Clay coated Kraft or carton, (7) Lacquer coated Kraft or carton, and (8) Combinations thereof (for example, (1) followed by (2) or (1) or (4))

An inventive article may comprise a combination of two or more embodiments as described herein.

Additives and Applications

An inventive composition may comprise one or more additives. Typically polymers and resins used in the invention are treated with one or more stabilizers, for example, antioxidants, such as IRGANOX 1010, IRGANOX 1076, and IRGAFOS 168, now supplied by BASF. Polymers are typically treated with one or more stabilizers before an extrusion or other melt processes. Other additives include, but are not limited to, ultraviolet light absorbers, antistatic agents, pigments and dyes, nucleating agents, fillers, slip agents, fire retardants, plasticizers, processing aids, lubricants, stabilizers, smoke inhibitors, viscosity control agents and anti-blocking agents. An inventive composition may also contain one or more thermoplastic polymers.

The inventive compositions may further comprise an oil. Oils are typically employed to reduce the viscosity of the adhesive. When employed, oils will be typically present in an amount greater than 0.5 weight percent, and less than 50, preferably less than 40, and more preferably less than 35 weight percent, based on the weight of the composition. Exemplary classes of oils include, but are not limited to, white mineral oil (such as KAYDOL oil available from Witco), and SHELLFLEX 371 naphthenic oil (available from Shell Oil Company) and CALSOL 5550 (napthenic oil from Calumet Lubricants).

The inventive compositions may be prepared by standard melt blending procedures. In particular, the functionalized polymer (e.g., a maleic anhydride-grafted polymer) tackifier(s) and other components may be melt blended until a homogeneous mix is obtained. Any mixing method producing a homogeneous blend, without degrading the adhesive components, is satisfactory, such as a vessel equipped with a stirrer, and an optional heating mechanism. The adhesives can be provided in forms, such as pellets, pillows, chiclets, drages, or any other desired configurations.

The inventive compositions may also be used in a variety of application, including, but not limited to, case and carton sealing, automotive, graphic arts, nonwovens, panel assembly, high performance tapes, contact hot melt adhesives, paperboard coatings, inks, personal care and cosmetic products, sealants, color and additive concentrates, carpet-tape adhesives, woodworking adhesives, and profile wrap adhesives.

Definitions

Unless stated to the contrary, all test methods are current as of the filing date of this disclosure.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "olefin-based interpolymer," as used herein, refers to an interpolymer that comprises, in polymerized form, a majority amount of olefin monomer, for example ethylene or propylene (based on the weight of the interpolymer), and at least one comonomer.

The term, "olefin-based copolymer," as used herein, refers to a copolymer that comprises, in polymerized form, a majority amount of olefin monomer, for example ethylene or propylene (based on the weight of the copolymer), and a comonomer, as the only two monomer types.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene-based interpolymer," as used herein, refers to an interpolymer that comprises, in polymerized form, a majority amount of ethylene monomer (based on the weight of the interpolymer), and at least one comonomer.

The term, "ethylene-based copolymer," as used herein, refers to a copolymer that comprises, in polymerized form, a majority amount of ethylene monomer (based on the weight of the copolymer), and a comonomer, as the only two monomer types.

The term, "ethylene/$\alpha$-olefin interpolymer," as used herein, refers to an interpolymer that comprises, in polymerized form, a majority amount of ethylene monomer (based on the weight of the interpolymer), and at least one $\alpha$-olefin.

The term, "ethylene/$\alpha$-olefin copolymer," as used herein, refers to a copolymer that comprises, in polymerized form, a majority amount of ethylene monomer (based on the weight of the copolymer), and an $\alpha$-olefin, as the only two monomer types.

The term, "propylene-based polymer," as used herein, refers to a polymer that comprises, in polymerized form, a majority amount of propylene monomer (based on the weight of the polymer), and optionally may comprise one or more comonomers.

The term, "propylene-based interpolymer," as used herein, refers to an interpolymer that comprises, in polymerized form, a majority amount of propylene monomer (based on the weight of the interpolymer), and at least one comonomer.

The term, "propylene-based copolymer," as used herein, refers to a copolymer that comprises, in polymerized form, a majority amount of propylene monomer (based on the weight of the copolymer), and a comonomer, as the only two monomer types.

The term, "propylene/$\alpha$-olefin interpolymer," as used herein, refers to an interpolymer that comprises, in polymerized form, a majority amount of propylene monomer (based on the weight of the interpolymer), and at least one $\alpha$-olefin.

The term, "propylene/$\alpha$-olefin copolymer," as used herein, refers to a copolymer that comprises, in polymerized form, a majority amount of propylene monomer (based on the weight of the copolymer), and an $\alpha$-olefin, as the only two monomer types.

The term, "propylene/ethylene interpolymer," as used herein, refers to an interpolymer that comprises, in polymerized form, a majority amount of propylene monomer (based on the weight of the interpolymer), and ethylene.

The term, "propylene/ethylene copolymer," as used herein, refers to a copolymer that comprises, in polymerized form, a majority amount of propylene monomer (based on the weight of the copolymer), and ethylene, as the only two monomer types.

The term "anhydride and/or carboxylic acid functionalized olefin-based interpolymer," and similar terms, as used herein, refer to an interpolymer (or copolymer) comprising bonded anhydride groups and/or bonded carboxylic acid groups. For example, a maleic anhydride functionalized olefin-based interpolymer.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. Nos. 4,701,432; 4,937,301; 4,935,397; 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin interpolymers include TAFMER polymers from the Mitsui Chemical Company, and EXACT and EXCEED polymers from ExxonMobil Chemical Company.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone.

Some polymers may be substituted with 0.01 long chain branches per 1000 total carbons to 3 long chain branch per 1000 total carbons, further from 0.01 long chain branches per 1000 total carbons to 2 long chain branch per 1000 total carbons, and further from 0.01 long chain branches per 1000 total carbons to 1 long chain branch per 1000 total carbons.

The substantially linear ethylene/α-olefin interpolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers useful in the invention have excellent processability, even though they have a relatively narrow molecular weight distribution. Surprisingly, the melt flow ratio (I10/I2), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the I10/I2 value also increases.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949), and Rudin, A., Modern Methods of Polymer Characterization, John Wiley & Sons, New York (1991) pp. 103-112.

In contrast to "substantially linear ethylene polymer," "linear ethylene polymer" means that the polymer lacks measurable or demonstrable long chain branches, that is, the polymer is substituted with an average of less than 0.01 long chain branch per 1000 carbons.

Test Methods

Melt Viscosity

Melt viscosity (of a polymer or a composition) is measured in accordance with ASTM D 3236 (177° C., 350° F.), using a Brookfield Digital Viscometer (Model DV-III, version 3), and disposable aluminum sample chambers. The spindle used, in general, is a SC-31 hot-melt spindle, suitable for measuring viscosities in the range from 10 to 100,000 centipoise. The sample is added to the chamber, which is, in turn, inserted into a Brookfield Thermosel, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermosel. The viscometer is turned on, and set to operate at a shear rate, which leads to a torque reading in the range of 40 to 60 percent of the total torque capacity, based on the rpm output of the viscometer. Readings are taken every minute for about 15 minutes, or until the values stabilize, at which point, a final reading is recorded.

Melt viscosity (of a polymer or a composition) at 190° C. can be measured as described above.

Melt Index

Melt index (I2, or MI) of an ethylene-based polymer is measured in accordance with ASTM D-1238, condition 190° C./2.16 kg. For high I2 polymers (I2 greater than, or equal to, 200 g/mole, melt index is preferably calculated from Brookfield viscosity as described in U.S. Pat. Nos. 6,335,410; 6,054,544; 6,723,810. I2(190° C./2.16 kg)=3.6126[10 $(10^{(log(\eta)-6.6928)/-1.1363})$]-9.31851, where $\eta$=melt viscosity, in cP, at 350° F.

Peel and Shear Strength

The peel adhesion failure temperature (PAFT) and shear adhesion failure temperature (SAFT) of the adhesive formulation were tested using ASTM D-4498. Four samples (two for PAFT and two for SAFT) were put in a programmable oven, then "100 g weight" for PAFT, and "500 g weight" for SAFT, were attached to the samples.

Two sheets of 6'×12' Kraft paper were used for lamination. Bottom sheet has two pieces of masking tape separated by a one inch gap. The adhesive was spread by a bottom glass rod that is shimmed with tape. A top glass rod supplies compression. Silicone paper at the end was to catch the excess adhesive. The final bond was defined by the two pieces of masking tape and was 1 inch wide. The molten adhesive was heated to 177° C., and poured onto the bottom sheet. The glass rods were then quickly drawn across to make the lamination. The laminated sheet was trimmed, and cut widthwise into "one inch wide strips." These strips had a "1 inch×1 inch bond" in the center. The samples were conditioned for 24 hours at room temperature and 54 percent RH (Relative Humidity). Then the samples were placed in the oven, with 100 g in a peel mode, and 500 g in a shear mode. The oven temperature was increased at a rate of 30° C./h. The samples were hung from a switch that tripped when the samples failed, and the time and temperature were recorded by a computer. Average results were reported.

Heat Stress

The heat stress resistance was measured according to the "Suggested Test Method for Determining the Heat Stress Resistance of Hot Melt Adhesives," method T-3006, prepared by the Institute of Packaging Professions (IoPP). To prepare one sample, two cardboard coupons (cut with flutes running in the long direction) having dimensions of "2 inch×3 3/16 inch" and "2 inch×5 1/2 inch" were bonded, by applying "0.00014 lb/in of adhesive" with an Olinger Bond Tester. The adhesive was applied perpendicular to the flutes, in the center of the shorter coupon, and the coupons were bonded, such that the adhesive was 3/4 inch from one end of the long coupon. Five replicates were made for each formulation. Samples were loaded into the sample holder, with the short coupon end aligned with the edge of the sample holder. The samples were held in place with the wide plate secured by wingnuts. A "200 g weight" was placed 3.94 inch from the bond. The weight was secured by placing the peg, on the weight, into a hole made in the long coupon. The sample holder was then placed into a convection oven, at a set temperature, for 24 hours. If at least 80% of the bonds do not fail, than the sample was considered to have passing heat resistance at the test temperature. The oven temperature was varied, until the maximum "passing" temperature was determined. All new bonded coupon samples were used for each test temperature.

Fiber Tear

The percentage of fiber tear of each adhesive sample was evaluated on a "hard to bond" substrate (see Experimental section) at three different temperatures; room temperature, −17° C. and 60° C. The fiber tear results using a Hard-To-Bond (HTB) substrate were recorded. The adhesive was heated to 350° F./177° C., and was applied on the substrate cut into "1 inch×3 inch (25 mm×76 mm)" rectangular sheets. The adhesive to be tested was applied, running lengthwise, as about a "5 mm/0.2 in" wide strip, and was drawn down with a spatula or hot melt applicator. Then a second strip was applied, within two seconds, and held, with moderate pressure (1500 Pa), for five seconds to laminate.

The bonds were conditioned for 24 hours at room temperature and 54 percent RH (Relative Humidity), and then pulled apart at the test temperatures of room temperature, −17° C. or 60° C. Each bond was tested immediately, after the conditioning period ended. The bond was torn by inserting the blade of a spatula under one corner to fold up the corner. The bond was then placed on a horizontal surface, with the side with the folded corner faced up. With the laminate held as near as possible to the source of heating or cooling, in order to maintain the conditioning temperature, the folded corner was manually pulled as rapidly, as possible, at roughly a 45 to 90 degree angle, relative to each sheds lengthwise axis, to tear the adhesive bond. The percent of torn fiber was estimated (fiber tear or FT) in 25 percent increments; that is, 0 percent, 25 percent, 50 percent, 75 percent and 100 percent. Unless otherwise stated, the Fiber Tear test is normally repeated on five replicate samples, and the average of these five runs reported.

Gel Permeation Chromatography

The average molecular weights and molecular weight distributions for ethylene-base polymers are determined with a chromatographic system, consisting of either a Polymer Laboratories Model PL-210 or a Polymer Laboratories Model PL-220. The column and carousel compartments are operated at 140° C. for ethylene-based polymers. The columns are three Polymer Laboratories 10-micron, Mixed-B columns. The solvent is 1,2,4-trichloro-benzene. The samples are prepared at a concentration of "0.1 gram of polymer" in "50 milliliters" of solvent. The solvent used to prepare the samples contains "200 ppm of butylated hydroxytoluene (BHT)." Samples are prepared by agitating lightly for two hours at 160° C. The injection volume is "100 microliters," and the flow rate is "1.0 milliliters/minute."

Calibration of the GPC column set is performed with narrow molecular weight distribution polystyrene standards, purchased from Polymer Laboratories (UK). The polystyrene standard peak molecular weights are converted to polyethylene molecular weights using the following equation (as described in Williams and Ward, J. Polym. Sci., Polym. Let., 6, 621 (1968)):

$$M_{polyethylene} = A \times (M_{polystyrene})^B,$$

where M is the molecular weight, A has a value of 0.4315 and B is equal to 1.0. Polyethylene equivalent molecular weight calculations were performed using VISCOTEK TriSEC software Version 3.0. The molecular weights for polypropylene-based polymers can be determined using Mark-Houwink ratios according to ASTM D6474.9714-1, where, for polystyrene a=0.702 and log K=−3.9, and for polypropylene, a=0.725 and log K=−3.721. For polypropylene-based samples, the column and carousel compartments are operated at 160° C.

DSC

Differential Scanning Calorimetry (DSC) is used to measure crystallinity in ethylene (PE) based polymer samples and propylene (PP) based polymer samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (e.g., for PE, % cryst.=($H_f$/292 J/g)× 100; and for PP, % cryst.=($H_f$/165 J/g)×100).

Unless otherwise stated, melting point(s) ($T_m$) of each polymer is determined from the second heat curve obtained from DSC, as described above. The crystallization temperature ($T_c$) is measured from the first cooling curve.

Density

Density is measured in accordance with ASTM D-792.

Fourier Transform Infrared Spectroscopy (FTIR) Analysis—Maleic Anhydride Content The concentration of maleic anhydride can be determined by the ratio of peak heights of the maleic anhydride at wave number 1791 $cm^{-1}$ to the polymer reference peak, which, in case of polyethylene, is at wave number 2019 $cm^{-1}$. Maleic anhydride content is calculated by multiplying this ratio with the appropriate calibration constant. The equation used for maleic grafted polyolefins (with reference peak for polyethylene) has the following form, as shown in Equation 1.

MAH (wt %)=$A$*{[FTIR PeakArea@1791 cm−1]/ [FTIR PeakArea 2019 cm−1]+B*[FTIR PeakArea@1712 cm−1]/[FTIR_PeakArea@2019 cm−1]} (Eqn. 1)

The calibration constant A can be determined using C13 NMR standards. The actual calibration constant may differ slightly depending on the instrument and polymer. The second component at wave number 1712 $cm^{-1}$ accounts for the presence of maleic acid, which is negligible for freshly grafted material. Over time however, maleic anhydride is readily converted to maleic acid in the presence of moisture. Depending on surface area, significant hydrolysis can occur in just a few days under ambient conditions. The acid has a distinct peak at wave number 1712 $cm^{-1}$. The constant B in Equation 1 is a correction for the difference in extinction coefficients between the anhydride and acid groups.

The sample preparation procedure begins by making a pressing, typically 0.05 to 0.15 millimeters in thickness, in a heated press, between two protective films, at 150-180° C. for one hour. MYLAR and TEFLON are suitable protective films to protect the sample from the platens. Aluminum foil must never be used (maleic anhydride reacts with aluminum). Platens should be under pressure (~10 ton) for about five minutes. The sample is allowed to cool to room temperature, placed in an appropriate sample holder, and then scanned in the FTIR. A background scan should be run before each sample scan, or as needed. The precision of the test is good, with an inherent variability of less than ±5%. Samples should be stored with desiccant to prevent excessive hydrolysis. Moisture content has been measured as high as 0.1 weight percent. The conversion of anhydride to acid however is reversible with temperature, but may take up to one week for complete conversion. The reversion is best performed in a vacuum oven at 150° C.; a good vacuum (near 30 inches Hg) is required. If the vacuum is less than adequate the sample tends to oxidize resulting in an infrared peak at approximately 1740 $cm^{-1}$, which will cause the values for the graft level to be too low. Maleic anhydride and acid are represented by peaks at about 1791 and 1712 $cm^{-1}$, respectively.

The polymers, compositions and processes of this invention, and their use, are more fully described by the following examples. The following examples are provided for the purpose of illustrating the invention, and are not to be construed as limiting the scope of the invention.

EXPERIMENTAL

Functionalized polymers (each available from Honeywell) are shown in Table 1.

TABLE 1

| Functionalized Polymers | | Viscosity cP@ 190° C. | Density, g/cm³ |
|---|---|---|---|
| A-C, 597P* | Propylene Maleic Anhydride Copolymer | 350 | 0.94 |
| A-C 907P | Propylene Maleic Anhydride Copolymer | 350 | 0.93 |
| A-C 596P* | Propylene Maleic Anhydride Copolymer | 150 | 0.93 |
| A-C 950P* | Propylene Maleic Anhydride Copolymer | 2000 | 0.93 |
| A-C 1325P* | Propylene Maleic Anhydride Copolymer | 1600 | 0.92 |

*Ethylene comonomer.

Adhesive components are listed below. Adhesive formulations are shown in Tables 2-5.

AFFINITY GA 1875 (ethylene/octene copolymer; melt viscosity at 177° C. (350° F.) 5700-7700 cP, and density 0.868-0.873 g/cm³.

Low molecular weight propylene/octene copolymer (Low MW PP) melt viscosity at 177° C. (350° F.)=8147 cP, and a density of 0.868 g/cc (1 cc=1 cm³).

Tackifier: EASTOTAC H115, supplied by Eastman Chemical Company.

Wax: SASOLWAX H1, a Fischer-Tropsch wax, supplied by Sasol Wax.

IRGANOX 1010 (I1010) was used as antioxidant.

The "Hard-to-Bond (HTB)" substrate was BOPP (Biaxial Oriented Polypropylene) laminated substrate. Other hard-to-bond substrates, as discussed above, may also be used.

Adhesive Formulations

Components for the adhesive compositions were weighed into an aluminum container, and preheated in an oven, at 180° C. for one hour. The components in the container were then mixed in a heated block at 180° C. for 30 minutes, with a "Paravisc style" mixer head at 100 RPM. Each adhesive composition contained the following: polymer, wax, tackifier resin, and antioxidant. The wax, tackifier and antioxidant are each described above.

TABLE 2

Low MW PP = 40 wt %,
Substitution of SASOL WAX H1 with 5 wt % to 30 wt % of the AC-596P

| Ex. | Formulation 40 wt % Low MW PP 34.5 wt % EASTOTAC H115 0.5 wt % I1010 | Viscosity @177° C. cP | SAFT ° C. | PAFT ° C. | Fiber Tear at HTB Substrate | | | Passing Heat Stress ° C. |
|---|---|---|---|---|---|---|---|---|
| | | | | | −17° C. | RT | 60° C. | |
| 1 | 25 wt % SASOL H1 | 277 | 90.3 | 46.6 | 0 | 41 | 58 | 50 |
| 2 | 23.75 wt % SASOL H1; 1.25 wt % AC-596P | 385 | 90.9 | 49.0 | 9 | 27 | 83 | 50 |
| 3 | 22.5 wt % SASOL H1; 2.5 wt % AC-596P | 348 | 92.5 | 53.4 | 38 | 95 | 92 | 55 |
| 4 | 20 wt % SASOL H1; 5 wt % AC-596P | 292 | 94.4 | 55.0 | 0 | 0 | 92 | 65 |
| 5 | 17.5 wt % SASOL H1; 7.5 wt % AC-596P | 244 | 98.3 | 54.1 | 17 | 3 | 100 | 65 |

As seen in Table 2, increasing the amount of the AC-596P in the formulations, resulted in improved SAFT, PAFT and/or Heat Stress. Adhesion to the HTB substrate also improved, especially at 60° C. In Example 3, the adhesion on HTB was greater than 90% at RT and 60° C. In Examples 4 and 5, high Heat Stress values (65° C.) resulted.

As seen in Table 3, increasing the amount of the AC-596P in the formulations, resulted in improved SAFT, PAFT, Fiber Tear and/or Heat Stress. Example 10 had excellent overall adhesive performance with the highest level of AC-596P. Compared with Example 6, having no AC-596P, the adhesive performance of Example 10 improved significantly: PAFT had 12° C. increase; Heat stress had >10° C. increase to reach a target at 6° C.; Fiber tear (HTB) at 6° C. and RT were also improved to excellent levels.

TABLE 3

Low MW PP = 45 wt %,
Substitution of SASOL WAX H1 with 15 wt % to 75 wt % of the AC-596P

| Ex. | Formulation 45 wt % Low MW PP 29.5 wt % EASTOTAC H115 0.5 wt % I1010 | Viscosity @177° C. cP | SAFT ° C. | PAFT ° C. | Fiber Tear at HTB Substrate | | | Passing Heat Stress ° C. |
|---|---|---|---|---|---|---|---|---|
| | | | | | −17° C. | RT | 60° C. | |
| 6 | 25 wt % SASOL H1 | 509 | 89.8 | 43.5 | 0 | 12 | 0 | 45 |
| 7 | 21.25 wt % SASOL H1; 3.75 wt % AC-596P | 576 | 99.4 | 46.5 | 0 | 21 | 29 | 50 |
| 8 | 18.75 wt % SASOL H1; 6.25 wt % AC-596P | 603 | 92.2 | 51.0 | 0 | 12 | 39 | 50 |
| 9 | 12.5 wt % SASOL H1; 12.5 wt % AC-596P | 775 | 91.0 | 52.1 | 0 | 56 | 91 | 55 |
| 10 | 6.25 wt % SASOL H1; 18.75 wt % AC-596P | 970 | 91.2 | 55.1 | 0 | 73 | 100 | 60 |

TABLE 4

Low MW PP = 50 wt %,
Substitution of SASOL WAX H1 with 25 wt % to 100 wt % of the AC-596P

| Ex. | Formulation 50 wt % Low MW PP 29.5 wt % EASTOTAC H115 0.5 wt % I1010 | Viscosity @177° C. cP | SAFT ° C. | PAFT ° C. | Fiber Tear at HTB Substrate −17° C. | RT | 60° C. | Passing Heat Stress ° C. |
|---|---|---|---|---|---|---|---|---|
| 11 | 20 wt % SASOL H1 | 733 | 87.0 | 44.2 | 0 | 1 | 0 | 40 |
| 12 | 15 wt % SASOL H1; 5 wt % AC-596P | 829 | 86.4 | 52.9 | 0 | 10 | 60 | 45 |
| 13 | 12.5 wt % SASOL H1; 12.5 wt % AC-596P | 853 | 90.4 | 50.5 | 0 | 28 | 83 | 45 |
| 14 | 5 wt % SASOL H1; 15 wt % AC-596P | 1237 | 88.3 | 55.3 | 8 | 100 | 86 | 50 |
| 15 | 20 wt % AC-596P | 1537 | 98.5 | 62.4 | 100 | 100 | 39 | 45 |

As seen in Table 4, increasing the amount of the AC-596P in the formulations, resulted in improved SAFT, PAFT, Fiber Tear and/or Heat Stress. Example 14 had excellent adhesive performance with 75 wt % replacement of the SASOL H1 wax with the AC-596P. Overall, with more AC-596P content, the adhesive performance improved.

Overall, the MAH grafted wax (Honeywell AC-596P as a representative example) significantly improved adhesive performances in adhesives based on a low MW PP polymer. In general, PAFT/SAFT and heat stress properties have dramatically improved (>10° C.) with increasing content of "MAH-functionalized low molecular weight polymer" in the formulation. The adhesion on HTB substrates also improved, especially at RT and 6° C. Also, the polymer (Low MW PP) content was able to reach high level of 50 wt %, and still maintain good adhesive performance.

TABLE 5

AFFINITY GA 1875 = 40 wt %,
Substitution of SASOL WAX H1 with 20 wt % to 60 wt % of the AC-596P

| Ex. | Formulation 40 wt % AFFINITY GA 1875 35 wt % EASTOTAC H100 0.5 wt % I11010 | Viscosity @177° C. cP | SAFT ° C. | PAFT ° C. | Fiber Tear at HTB Substrate −17° C. | RT | 60° C. | Passing Heat Stress ° C. |
|---|---|---|---|---|---|---|---|---|
| 16 | 25 wt % SASOL H1 | 546 | 93 | 50 | 0 | 29 | 56 | 40 |
| 17 | 20 wt % SASOL H1; 5 wt % AC-596P | 678 | 94 | 52.5 | 13 | 60 | 60 | 45 |
| 18 | 15 wt % SASOL H1; 10 wt % AC-596P | 840 | 96 | 55 | 27 | 67 | 78 | 50 |
| 19 | 10 wt % SASOL H1; 15 wt % AC-596P | 1008 | 96 | 55 | 35 | 80 | 88 | 50 |

As seen in Table 5, increasing the amount of AC-596P in the formulations, resulted in improved SAFT, PAFT, Fiber Tear and/or Heat Stress. Example 19 had excellent adhesive performance with the highest AC wax dosage. Overall, with more AC-596P content, the adhesive performance was improved in PAFT, SAPF, Fiber tear using hard to bond substrates, and Heat Stress.

The invention claimed is:

1. A composition comprising the following components:
   A) from 40 wt % to 70 wt % of a propylene-based polymer;
   B) from 1 wt % to 20 wt % of an anhydride and/or carboxylic acid functionalized olefin-based interpolymer comprising the following properties:
      i) a melt viscosity, at 190° C., less than, or equal to, 10,000 cP, and
      ii) a density from 0.900 to 0.950 g/cc; and
      wherein component B is an anhydride and/or carboxylic acid functionalized propylene/alpha-olefin interpolymer or an anhydride and/or carboxylic acid functionalized propylene/ethylene interpolymer;
   C) from 2 wt % to 25 wt % of a wax; and
   D) from 20 wt % to 40 wt % of a tackifier,
   wherein the sum weight of component A and component B is greater than 40 wt %, based on the weight of the composition;
   the sum weight of component B and component C is 25 wt % based on the weight of the composition; and
   the composition has a fiber tear on a Hard-to-Bond biaxial oriented polypropylene substrate at 60° C. greater than 90%.

2. The composition of claim 1, wherein the anhydride and/or carboxylic acid functionalized olefin-based interpolymer of component B has a melt viscosity, at 190° C., less than, or equal to, 5,000 cP.

3. The composition of claim 1, wherein the propylene-based polymer of component A has a melt viscosity, at 177° C., less than, or equal to, 50,000 cP.

4. The composition of claim 3, wherein the propylene-based polymer of component A has a density from 0.860 g/cc o 0.895 g/cc.

5. The composition of claim 1, wherein the propylene-based polymer is a propylene/alpha-olefin interpolymer.

6. The composition of claim 1, wherein the sum weight of component A and component B is greater than, or equal to, 45 wt %, based on the weight of the composition.

7. The composition of claim 6 wherein the compositions comprises from 5 wt % to 20 wt % of the wax; and
the fiber tear on the Hard-to-Bond biaxial oriented polypropylene substrate at 60° C. is 100%.

8. A composition comprising the following components:
A) 40 wt % of a propylene/octene copolymer;
B) from 1 wt % to 20 wt % of an anhydride and/or carboxylic acid functionalized propylene/alpha-olefin interpolymer comprising the following properties:
  i) a melt viscosity, at 190° C., less than, or equal to, 10,000 mPas, and
  ii) a density from 0.900 to 0.950 g/cc;
wherein a sum weight of component A and component B is greater than 40 wt %;
C) from 2 wt % to 25 wt % of a wax; and
D) from 20 wt % to 40 wt % of a tackifier;
the sum weight of component B and component C is 25 wt %, with weight percentages for components A), B), C), and D) based on the weight of the composition; and
the composition has a fiber tear on a Hard-to-Bond biaxial oriented polypropylene substrate at 60° C. greater than 90%.

9. The composition of claim 8, wherein:
component A has:
  a melt viscosity of 8147 mPa·s at 177° C.; and
  a density of 0.868 g/cc; and
component B has:
  has a melt viscosity from 150 to 2000 mPa·s at 190° C.; and
  a density from 0.92 to 0.94 g/cc.

10. The composition of claim 9, wherein the sum weight of component A and component B is greater than, or equal to, 45 wt %, based on the weight of the composition.

11. The composition of claim 10 wherein the composition comprises from 5 wt % to 20 wt % of the wax; and
the fiber tear on the Hard-to-Bond biaxial oriented polypropylene substrate at 60° C. is 100%.

12. An article comprising a component formed from the composition of claim 1.

13. The article of claim 12 further comprising a substrate.

* * * * *